United States Patent Office 3,605,899
Patented Sept. 20, 1971

3,605,899
METHOD OF INCREASING PERMEABILITY OF CEMENT PACKS
Jack F. Tate and Thomas E. Sample, Jr., Houston, Tex., assignors to Texaco Inc., New York, N.Y.
No Drawing. Filed Nov. 28, 1969, Ser. No. 880,973
Int. Cl. E21b 43/27
U.S. Cl. 166—300                                     14 Claims

ABSTRACT OF THE DISCLOSURE

Permeability of a cement pack containing acid-soluble materials in a wellbore traversing a producing formation is improved by the controlled generation in situ of a halogenated acid whereby acid-soluble materials accumulated at the pack face and within the cement pack are dissolved and the flow of fluids therethrough is facilitated, without substantially weakening the mechanical strength of the cement pack.

BACKGROUND OF THE INVENTION

This invention relates to a method for improving the permeability of cement packs containing acid-soluble materials set into subterranean hydrocarbon-bearing formations. The improvement is accomplished by the generation in situ of a halogenated acid which subsequently reacts to dissolve acid-soluble materials obstructive to fluid movement through the pack faces, or within the packs themselves, thereby facilitating the flow of fluids therethrough and consequently increasing recovery of hydrocarbons from the formation.

Migration of sand or other particulate matter into the wellbore and downhole tubing of oil and gas wells frequently creates serious problems. For example, damage to the casing, sloughing of the wellbore wall, plugging of the wellbore, and damage to submerged pumping equipment and downhole tubing may occur. While unconsolidated sands are found in many oil and gas producing areas, they are most common in offshore and coastal marsh regions of the United States where production is from the more recent geologic sediments, such as the Miocene formation. Such formations almost invariably contain some acid-soluble material.

Several approaches have been made in attempts to exclude sand from producing wells drilled into such formations. One method involves the so-called "gravel packing" technique, in which gravel is positioned by use of fluid pressure in the borehole adjacent to producing formations. By applying pressure and reciprocating the drill pipe or tubing, gravel is forced through the perforations against the sand face of the formation and into fractures of the formation. A more recently adapted technique involves the use of crushed walnut shells which are coated with an unset plastic and forced into the producing zone by means of a carrier fluid. The plastic coating is then caused to harden, thus consolidating the mass of walnut shells into a permeable filter screen. While these methods have been used with some success, sand migration generally still occurs with plugging the result.

Another approach to sand migration and related problems has been the use of permeable cement packs, wherein cement compositions are used, prepared according to teachings established in the art. The cement compositions are then pumped into the wellbore and placed and set at the desired location traversing a producing horizon in the subterranean formation. However, these methods often fail to produce effective screening media, since excessively permeable packs may result negating the effectiveness of the pack as a filter. Furthermore, failure to satisfy certain critical conditions during the formulation of the compositions and placement of the packs have in some cases resulted in too low a permeability, thereby restricting even more the flow of fluids and the rate of hydrocarbon production. Finally, after placement is effected and production is resumed, the small cement(ed) particles can act as sites for nucleation and precipitation of solids from the formation water which may be supersaturated with respect to certain slightly soluble inorganic salts. Consequently, these methods have not been widely adopted by the industry.

Another difficulty that arises with the use of cement packs is that frequently in the case of new cement packs it may be necessary to use an oil squeeze or acidization treatment to achieve initial flow therethrough of formation fluids. Such treatment with conventional mineral acids which react instantaneously with the cement matrix may cause the cement matrix to become so weakened that the cement pack, and indeed the formation itself, may collapse due to excessively rapid erosion by the acid.

Additionally, because of the instantaneous reaction rate, the conventional mineral acid necessarily spends itself in that part of the matrix nearest the wellbore, so that little of the desired in-depth increase in permeabiliy is realized, either in the pack or in the formation adjacent thereto. Finally, subsurface equipment may be damaged by attack of the strong acid. One suggested solution to overcome these disadvantages has been the use of "retarded acids," which consist of a Brønsted acid in combination with an additive that affects the rate of acid attack. However, although such mixtures may be displaced before extensive reaction occurs, they have the inherent disadvantage that when they do react, they usually react swiftly, often unpredictably, and without substantially resolving the problem of cavitation.

Accordignly, it is an object of the present invention to provide an improved method for increasing permeability more uniformly of a cement pack placed in a wellbore drilled into a subterranean hydrocarbon-bearing formation.

It is another object of this invention to provide a method for the acid treatment of a cement pack in a wellbore to remove acid-soluble components thereof with a minimum loss in the mechanical strength of the cement pack.

SUMMARY

This invention relates to a method for improving the permeability of cement packs containing acid-soluble materials placed in wellbores drilled into subterranean hydrocarbon-bearing formations wherein a halogenated acid is generated in situ at a finite rate which acid thereafter reacts with the acid-soluble materials accumulated at the pack face and within the pack itself, so as to increase the the permeability of the cement pack and thereby facilitate the flow of fluids from the formation into the wellbore.

In contrast with prior art procedures outlined above, the method of invention employs a potentially acid material, hereafter referred to as an aproatic halogenated material, and a hydroxylic fluid, which are capable of reaction to generate a halogenated acid which acid thereafter reacts in situ with the acid-soluble materials accumulated at the pack face and within the pack itself. By this method, more effective control of the solubilization of the acid-soluble materials of the cement pack is achieved, whereby more uniform permeability increases can be attained and at the same time minimum loss in the mechanical strength of the cement pack realized.

DESCRIPTION OF THE INVENTION

According to the present method, a mixture of potentially acidic material, hereafter referred to as an aprotic halogenated material, and an hydroxylic fluid are injected into a wellbore containing a cement pack having acid-soluble materials set therein into which the mixture is injected under pressure and whereinafter a halogen acid is produced at a finite rate which subsequently reacts with the acid-solubles of the cement composition itself to increase the permeability of the cement pack, thereby facilitating the flow of fluids therethrough, permitting increased recovery of hydrocarbons from the formation.

Preferably, the method of the invention may be employed by introducing a mixture of the aprotic halogenated material and an hydroxylic fluid via the wellbore and injecting the mixture under pressure into the cement pack, wherein the reaction of the aprotic halogenated material and hydroxylic fluid occurs.

The method can also be employed as a stepwise procedure whereby a slug of the hydroxylic fluid is introduced via a wellbore into the cement pack and which is thereafter followed by a slug of the aprotic halogenated material down the wellbore wherein the succession of slugs is forced into the pack under pressure. This procedure may be further modified to include stepwise injection of smaller slugs of the hydroxylic fluid and aprotic halogenated material in an alternating fashion.

Finally, in any of the methods employed, it is also possible to incorporate an emulsifying agent into the mixture to form a stabilized emulsion of the aprotic halogenated material and hydroxylic fluid which mixture is introduced under pressure via a wellbore into the cement pack set therein. An advantage of incorporation of the emulsifying agent in the mixture is that the contact area between the reactants is increased greatly, with the result that the rate and/or the extent of the reaction between the aprotic halogenated material and the hydroxylic fluid may be more readily controlled.

After the treatment has been carried out by one of the methods cited above, the well is backflowed and placed on production.

The aprotic halogenated materials employed in this invention are organic halides which are potentially acidic compounds, but which contain no hydrogen capable of reacting directly with acid-solubles in the formation to any appreciable degree, but rather react first with an hydroxylic fluid, usually water, to liberate a halogenated acid at a finite rate. Substances useful for the purposes of this invention may be found in the following types of organic halogen compounds: allylic halides; propargylic halides; primary, secondary and tertiary saturated alkyl halides containing from one to five carbon atoms together with an active halogen; alpha- and beta-halogenated ethers having from two to six carbon atoms; halohydrins having from two to six carbon atoms; alpha-haloalkyl aryl ketones having from one to three carbon atoms in the alkyl chain; alpha-haloalkyl aromatics containing from one to three carbon atoms in the alkyl chain; and alkyl hypohalites containing from two to six carbon atoms. By the term "active halogen," it is meant a halogen that is capable of reacting with an hydroxylic fluid. Vinyl and aprotic aryl halides are ordinarily not sufficiently susceptible to reaction within the conditions of this invention to be generally useful for its practice.

Illustrative examples of halogenated compounds suitable for use in this invention include allyl chloride, 1-chloro-2-butene, propargyl chloride, n-propyl chloride, tert-butyl chloride, di(chloromethyl)ether, di(2-chloroisopropyl)ether, epichlorohydrin, ethylene chlorohydrin, omega-chloroacetophenone, benzyl chloride, benzilidene chloride, and tert-butyl hypochlorite. Analogous bromides and iodides, providing of course they are of sufficient stability, may also be used.

Organic fluorides are generally less suitable as reactants because of their tendency to form sparingly soluble alkaline earth fluorides and their generally depressed reactivity.

Preferably, the organic halide would undergo complete or nearly complete decomposition during use and leave behind little or no objectionable residue in the produced hydrocarbon.

Owing to the extremely wide variance in composition, physical properties and environmental conditions associated with subterranean hydrocarbon-bearing formations and the permeable cementing compositions used therein, a proper choice of the particular organic halogenated material best suited for the practice of the present method in a specific formation necessarily must take into account such formation factors as depth, pressure and temperature associated with the formation, its fluid content and such characteristics of the cemented pack as permeability and porosity, carbonate content, state and degree of matrix consolidation, strength, and the like. The proper choice of organic halide is therefore best arrived at from the results obtained from laboratory tests performed on pack formulations which will actually be used in the well in question, evaluated in the light of all the pertinent information gained in the process of drilling and completing the well and its subsequent production behavior.

The hydroxylic fluid used in this invention is one which is capable of reacting with the organic halide to produce the corresponding halogenated acid. Hydroxylic fluids may be selected from fluids in which a hydroxyl group is attached to either the hydrogen atom or an alkyl radical and mixtures thereof.

The preferred hydroxylic fluid is water, although mixtures of water and a water-miscible alcohol such as methyl alcohol, ethyl alcohol, or isopropyl alcohol may be used.

If the method of invention employs a surface-active agent, a suitable agent is one which would not react chemically to any appreciable extent with the hydroxylic fluid or the aprotic halogenated material, but act only to produce a relatively stable, homogeneous dispersion between the two reactants. Such materials which are suitable are water-miscible, acid-stable, non-ionic surfactants of the hydroxyethylated, alkyl-aryl phenol category marketed by numerous manufacturers under such trade names as "Surfonic-N," "Triton-X," "Retzanol-NP," etc. A preferred particular surfactant in this category is "Surfonic-N–95."

The range of concentration of the aprotic halogenated material may vary within rather wide limits. The aprotic halogenated material may be effectively employed as a slug, or a solution if it is sufficiently soluble in the hydroxylic fluid, or if incompletely immiscible, as a stabilized suspension or emulsion. The preferred range of concentration may vary from about 0.1 percent by weight to about 40 percent by weight.

In the accompanying table the effectiveness of the present invention is demonstrated. A permeable cement mixture was prepared by mixing 1400 gm. of 20/40 mesh Ottawa sand, 254 gm. light weight hydraulic cement, and 175 ml. of a brine prepared by dissolving gm. $CaCl_2$ and 30 gm. NaCl in 100 ml. of water. Cylindrical plugs were prepared from this cement mixture and their permeabilities and compressive strengths measured. Five gallons of a 0.25 percent weight/weight mixture of allyl chloride in water was circulated through the plugs, connected in parallel, for one hour, after which the experiment was terminated. Permeabilites in millidarcies (md.) and compressive strengths in pounds per square inch (p.s.i.) of each core were then redetermined.

| Core No. | Permeability (md.) | | Strength (p.s.i.) | |
|---|---|---|---|---|
| | Initial | Final | Initial | Final |
| 1 | 7.0 | 21.9 | [1] 1,490 | 820 |
| 2 | 9.0 | 27.2 | | 615 |
| 3 | 12.5 | 50.5 | | 580 |
| 4 | 9.6 | 20.5 | | 755 |
| 5 | 7.0 | 21.9 | | 580 |
| 6 | 10.6 | 23.9 | | 650 |

[1] Average.

The results show that a three-fold increase in permeability was effected.

Although the cement plugs showed a decrease in compressive strength, as anticipated, it was not great enough to significantly alter their function as mechanical barriers. In contrast, identical plugs exposed to even dilute mineral acid rapidly disintegrated and became formless.

The results demonstrate that treatment of permeable cement packs in subterranean hydrocarbon-bearing formations with aprotic halogenated materials can increase the permeability of the packs at least three-fold without loss of their physical integrity, and without severe damage to their mechanical strength. Where a lesser increase in permeability is desired, a less concentrated or less active aprotic halogenated material can be used. The resulting loss in mechanical strength of the cement would be correspondingly diminished.

We claim:

1. A method for improving the permeability of cement packs containing acid-soluble materials set in a wellbore traversing a subterranean hydrocarbon-bearing formation comprising introducing via said wellbore and injecting under pressure into said cement pack a mixture of an aprotic halogenated material and an hydroxylic fluid, said aprotic halogenated material being present in amounts sufficient to increase the flow capacity of said cement pack.

2. The method according to claim 1 wherein said aprotic halogenated material is selected from the group consisting of allylic halides, propargylic halides, saturated alkyl halides containing from one to five carbon atoms together with an active halogen, alpha- and beta-halogenated ethers having from two to six carbon atoms, halohydrins having from two to six carbon atoms, alpha-haloalkyl aryl ketones having from one to three carbon atoms in the alkyl chain, alpha-haloalkyl aromatics containing from one to three carbons in the alkyl chain, alkyl hypohalites containing from two to six carbon atoms and mixtures thereof.

3. The method of claim 2 wherein the aprotic halogenated material is allyl chloride.

4. The method of claim 2 wherein said aprotic halogenated material is mixed with an hydroxylic fluid in amounts in the range of about 0.1 percent by weight to about 40 percent by weight.

5. The method of claim 1 wherein said hydroxylic fluid is selected from the group in which the hydroxyl radical is attached to a function selected from the group consisting of the hydrogen atom, an alkyl radical and mixtures thereof.

6. The method of claim 5 wherein said hydroxylic fluid is water.

7. The method of claim 6 including the addition of a non-ionic emulsifying agent to said fluid mixture to form a suspension of said aprotic halogenated material in said hydroxylic fluid stable during the injection of said suspension into said formation.

8. The method of claim 7 wherein said non-ionic material is a hydroxyalkylated alkyl-aryl phenol.

9. A method for removal of acid-soluble materials from a cement pack in a wellbore traversing a subterranean hydrocarbon-bearing formation comprising introducing via said wellbore and injecting under pressure into said cement pack a mixture of an aprotic halogenated material and an hydroxylic fluid, said halogenated material and hydroxylic fluid being present in amounts sufficient to remove the acid-soluble materials contained in said cement pack and thereby restore the flow capacity of said cement pack.

10. The method according to claim 9 wherein said aprotic halogenated material is selected from the group consisting of allylic halides, propargylic halides, saturated alkyl halides containing from one to five carbon atoms together with an active halogen, alpha- and beta-halogenated ethers having from two to six carbon atoms, halohydrins having from two to six carbon atoms, alpha-haloalkyl aryl ketones having from one to three carbon atoms in the alkyl chain, alpha-haloalkyl aromatics containing from one to three carbons in the alkyl chain, alkyl hypohalites containing from two to six carbon atoms and mixtures thereof.

11. The method of claim 10 wherein said aprotic halogenated material is allyl chloride.

12. The method of claim 9 wherein said aprotic halogenated material is mixed with an hydroxylic fluid in amounts in the range of about 0.1 percent by weight to about 40 percent by weight.

13. The method of claim 9 wherein said hydroxylic fluid is selected from the group in which the hydroxyl radical is attached to a function selected from the group consisting of the hydrogen atom, an alkyl radical and mixtures thereof.

14. The method of claim 13 wherein said hydroxylic fluid is water.

References Cited
UNITED STATES PATENTS

| | | | |
|---|---|---|---|
| 2,059,459 | 11/1936 | Hund et al. | 166—300 |
| 2,187,895 | 1/1940 | Sanders | 166—276 |
| 3,215,199 | 11/1965 | Dilgren | 166—300X |
| 3,297,090 | 1/1967 | Dilgren | 166—300 |
| 3,307,630 | 3/1967 | Dilgren et al. | 166—300 |

STEPHEN J. NOVOSAD, Primary Examiner

U.S. Cl. X.R.

166—281